United States Patent [19]

Aquilino

[11] Patent Number: 5,492,150
[45] Date of Patent: Feb. 20, 1996

[54] COMBINATION CONTROL VALVE, PARTICULARLY SUITABLE FOR THERMOELECTRIC POWER PLANT

[75] Inventor: Gianfranco Aquilino, Trinitapoli, Italy

[73] Assignee: Nuovopignone-Industrie Meccaniche e Fonderia S.p.A., Florence, Italy

[21] Appl. No.: 288,186

[22] Filed: Aug. 9, 1994

[30] Foreign Application Priority Data

Aug. 13, 1993 [IT] Italy ................... MI93A1826

[51] Int. Cl.⁶ ................................. F16K 1/32
[52] U.S. Cl. ............... 137/630.13; 137/312; 137/630.15
[58] Field of Search .................. 137/312, 630.13, 137/630.14, 630.15

[56] References Cited

U.S. PATENT DOCUMENTS

| | | | |
|---|---|---|---|
| 4,022,247 | 5/1977 | Schweitzer | 137/630.13 |
| 5,113,902 | 5/1992 | Dorr | 137/630.13 X |
| 5,192,049 | 3/1993 | Ridge . | |

FOREIGN PATENT DOCUMENTS

| | | |
|---|---|---|
| 0308390 | 3/1989 | European Pat. Off. . |
| 2530772 | 1/1984 | France . |
| 2536824 | 6/1984 | France . |
| 2838973 | 4/1980 | Germany . |
| 395672 | 12/1965 | Switzerland . |

| | | |
|---|---|---|
| 2015704 | 9/1979 | United Kingdom . |

OTHER PUBLICATIONS

Patent Abstracts of Japan, vol. 9, No. 70 (M-367), Mar. 30, 1985, JP-A-59 200 883, Nov. 14, 1984.
Oleodinamica-Pneumatica, vol. 22, Dec. 1981, No. 12, H. Spohr, "Pilota Operativo a 2 vie, Valvole Verticali a 2 Posizioni con Sorveglianza Elettronica, Loro Costruzione e Impieghi", pp. 80-84.

*Primary Examiner*—Robert G. Nilson
*Attorney, Agent, or Firm*—Oblon, Spivak, McClelland, Maier & Neustadt

[57] ABSTRACT

A combination control valve wherein a seal directed towards the valve exterior is achieved by a double gland which straddles a lantern sleeve with an intermediate vent and is pressed axially between the stem and guide for the main valving member by preloaded elastic elements, said guide being held elastically pressed against the differently inclined surface of a shoulder ring retained by circular sectors fitted into the valve body, a series of labyrinths being interposed between said guide and said main valving member, the pilot valving member being of parabolic profile, a bellows elastic seal element being provided between the first seat and the valve body, the trim including a hollow cylindrical structure which is inserted coaxially into an end cavity in the main relying member, is provided with transverse holes arranged offset from corresponding holes in the cavity of the main valving member, and terminates with a parabolic profile.

4 Claims, 1 Drawing Sheet

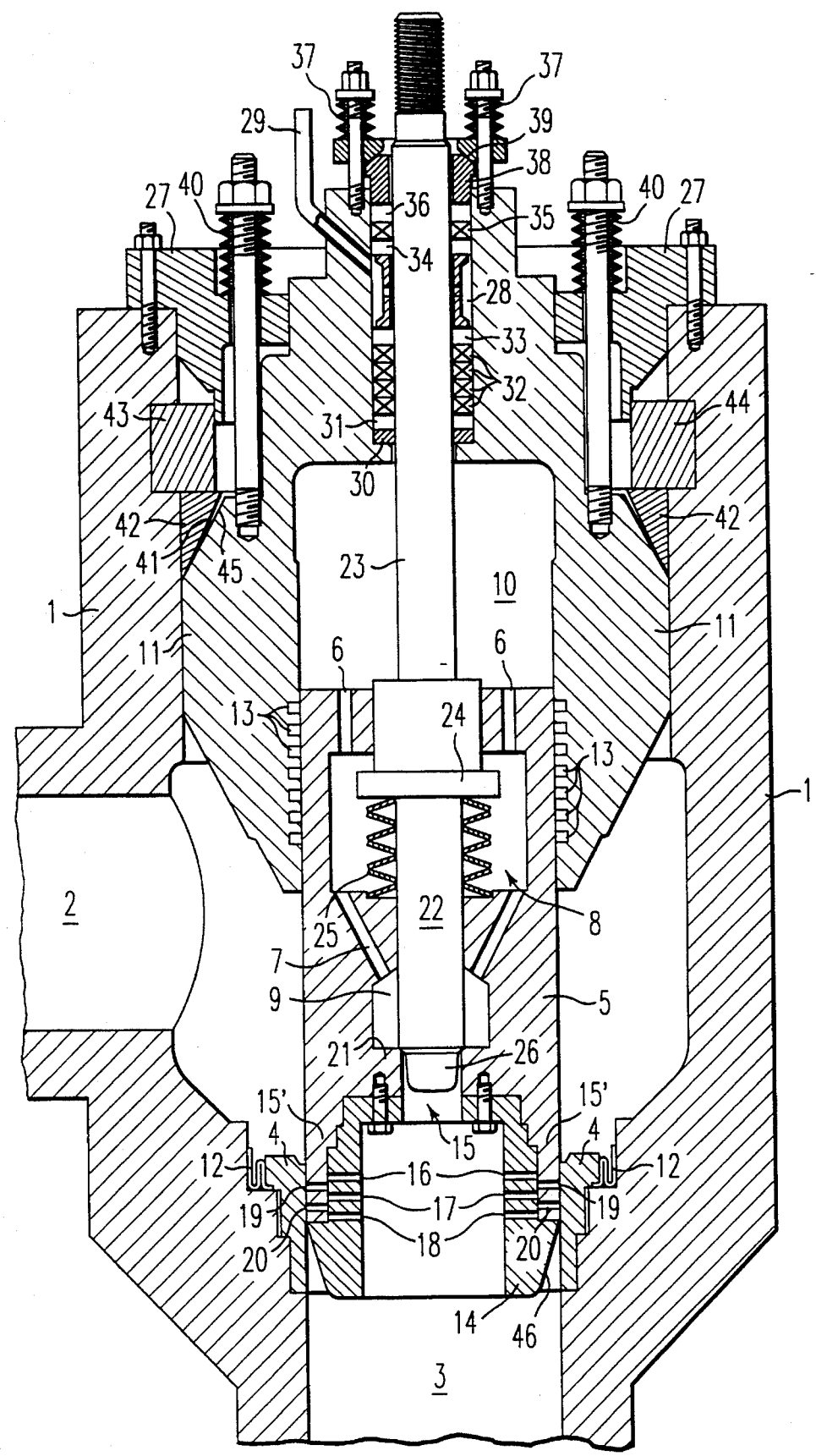

COMBINATION CONTROL VALVE, PARTICULARLY SUITABLE FOR THERMOELECTRIC POWER PLANT

BACKGROUND OF THE INVENTION

1. Field of the Invention

This invention relates to a new combination control valve which by using effective seal systems, a multiple pressure-step trim, suitable main and pilot valving member profiles and a series of labyrinths interposed between the main valving member and its guide, results in excellent control from minimum to maximum throughput, a high rangeability, an effective seal between the upstream and downstream sides of the valve and a perfect seal towards the valve exterior, intrinsic safety of said valve in the case of malfunction of the seal system towards the valve exterior, extreme ease and facility of disassembly and assembly, and a small actuation force requirement.

2. Discussion of the Background

As is well known, devices have to be installed between the primary and secondary superheater in the boiler start-up circuit of a thermoelectric power plant to keep the boiler out of action during plant start-up until the process fluid conditions upstream of such devices reach rated values, to reduce the pressure of the entire start-up flow and finally to allow said process fluid to pass at maximum throughput with low pressure drop.

Initially said devices consisted of two separate valves, one with a control function and the other with an on-off function. Currently, a single valve is used, known as a combination valve, which is able to perform both fuctions. Said combination valve comprises substantially a valve body provided with a fluid inlet and outlet, a first seat on said outlet for a main valving member provided with balancing holes and slidable along a guide by way of interposed seal elements for balancing the relying member, a pilot valving member rigid with the valve stem to cooperate with a second seat present within said main valving member and provided with a spring-loaded shoulder arranged to cooperate with the main valving member, a trim suitable for reducing the fluid pressure, and seal systems between said first seat and said valve body and, respectively, towards the valve exterior.

The known combination valves of the state of the art all present a series of drawbacks, the main one being that they provide neither a secure and effective seal towards the outside nor intrinsic safety in that, in the case of malfunction of the seal system towards the valve exterior, it is impossible to compensate for balancing purposes said outward leakage through said seal elements, thus causing depressurization of the chamber upstream and generating on this latter intolerable upstream forces leading to inevitable breakage.

Again, in addition to assembly and disassembly difficulty, a further drawback of said combination valves is that they are unable to achieve effective control at low loads and hence have a low rangeability, ie a ratio of minimum to maximum control capacity, which is only of the order of 1:250.

SUMMARY OF THE INVENTION

The object of the present invention is to obviate said drawbacks by providing a combination control valve which ensures a perfect seal towards the outside, intrinsic safety, a high rangeability and extreme ease of assembly/disassembly together with effective reduction of the fluid pressure.

This is substantially attained in that said effective seal system towards the valve exterior is achieved by a double gland which straddles a lantern sleeve with an intermediate vent for detecting leakages, is installed between said valve stem and the main valving member guide, and is pressed axially by preloaded elastic elements. In this manner, whereas the double gland ensures a reliable seal, its elastic property, by ensuring a constant axial loading equal to said preload, constantly provides the specific deformation of the double gland required for effective sealing. In order to make the disassembly/assembly of the combination valve simple and immediate, said main valving member guide is held, elastically pressed by a series of preloaded elastic elements, against a surface of a shoulder ring retained in position by circular sectors fitted into the valve body, said surface being of inclination different from that of said guide.

In this manner it is sufficient to simply remove said circular sectors, after removing said preloaded elastic elements, to make all the internal parts of the combination valve extractable. Again, said balancing seal elements interposed between said guide and said main valving member now consist of a series of labyrinths which, suitably dimensioned, are able not only to effectively balance the main valving member but also to compensate any leakages towards the valve exterior, thus ensuring intrinsic valve safety.

The pilot valving member is formed with a parabolic profile which, besides providing effective and precise flow control even at low flow and hence extending the valve control range, considerably raises its rangeability.

According to one characteristic of the present invention, the valve trim suitable for reducing the fluid pressure is formed from at least one hollow cylindrical structure inserted coaxially into a corresponding end cavity in said main valving member, this structure being provided with series of transverse holes arranged offset from a corresponding series of transverse holes in said cavity of said main valving member, and terminating with a parabolic profile.

In this manner, when the main valving member begins its travel an increasingly greater number of series of holes are gradually uncovered through which the fluid is compelled to pass, so drastically reducing its pressure. Once all the series of holes are uncovered, control is determined by the parabolic profile of the end of said cylindrical structure.

Finally, the effective seal between said first seat and said valve body is achieved by a substantially bellows shaped elastic element which is fixed between said first seat and said valve body. Hence, the combination control valve particularly suitable for thermoelectric power plant comprising substantially a valve body provided with a fluid inlet and outlet, a first seat on said outlet for a main valving member provided with balancing holes and slidable along a guide by way of interposed seal elements for balancing the valving member, a pilot valving member rigid with the valve stem to cooperate with a second seat present within said main valving member and provided with a spring-loaded shoulder arranged to cooperate with the main valving member, a trim suitable for reducing the fluid pressure and seal systems between said first seat and said valve body and, respectively, towards the valve exterior, is characterized according to the present invention in that said seal system towards the valve exterior is achieved by a double gland which straddles a lantern sleeve with an intermediate vent for detecting leakages, is installed between said valve stem and the main valving member guide, and is pressed axially by preloaded elastic elements, said guide being held, elastically pressed by its own series of preloaded elastic elements, against a surface of a shoulder ring retained in position by circular sectors fitted into the valve body, said surface being of an inclination different from that of said guide, said seal elements for balancing the main valving member which are interposed between said guide and said main valving member consisting of a series of labyrinths, said pilot valving member being formed with a parabolic profile, said trim suitable for reducing the fluid pressure being formed from at least one hollow cylindrical structure inserted coaxially into a corresponding end cavity in said main valving member, this structure being provided with series of transverse holes arranged offset from corresponding series of transverse holes in the walls of said cavity of said main valving member, and terminating with a parabolic profile, and finally the seal system between said first seat and said valve body consisting of an elastic seal element fixed between said first seat and said valve body respectively.

In order to achieve the most effective and perfect seal possible towards the valve exterior, experimental tests have shown that said double gland which straddles a lantern sleeve with an intermediate vent for detecting leakages must be formed, in succession towards the valve exterior, from a first gland consisting of a metal ring rigid with said main valving member guide, a high density base ring, four medium density rings and finally a high density top ring, followed after said lantern sleeve by a second gland consisting of a high density base ring, a medium density ring and a high density top ring.

According to a preferred embodiment of the present invention, said rings are formed from compressed graphite.

Finally, according to a further preferred embodiment of the present invention, said elastic seal element between said first seat and said valve body is a bellows fixed between said first seat and said valve body respectively.

BRIEF DESCRIPTION OF THE DRAWINGS

The invention is described in greater detail hereinafter with reference to the accompanying drawing, which illustrates a preferred embodiment thereof given by way of non-limiting example in that technical or constructional modifications can be made thereto without leaving the scope of the present invention. In said drawing, the figure represents a longitudinal section through a combination control valve constructed in accordance with she invention.

DESCRIPTION OF THE PREFERRED EMBODIMENTS

In said figure the reference numeral 1 indicates the body of the combination control valve comprising a fluid inlet 2 and outlet 3. On said outlet 3 there is mounted a first seat 4 for a main relying member 5 which, provided with balancing holes 6 and 7 and chambers 8 and 9, can slide within the chamber 10 of a guide 11. The effective seal between said first seat 4 and the valve body 1 is provided by a type elastic seal element 12 fixed by its ends to said elements respectively, whereas the seal between the main relying member 5 and the relative guide 11 is provided by a series of labyrinths 13.

The multiple pressure step valve trim member consists of a hollow cylindrical structure 14 which is inserted coaxially into a corresponding end cavity 15 in the main valving member 5 and comprises series of through transverse holes 16, 17 and 18 arranged circumferentially on the structure, to cooperate with corresponding series of through transverse holes 19 and 20 positioned offset to said series 16–18 and provided in the walls 15' of said structure 15. Said structure 14 terminates with a parabolic profile 46 which allows effective control of the fluid flow between said main valving member 5 and the relative seat 4. Within the main valving member 5 there is provided a second seat 21 for a pilot valving member 22 which is rigid with the valve stem 23 and cooperates with the main valving member 5 via its projecting shoulder 24 which is spring-loaded in the sense of opening said pilot valving member 22, which comprises a head 26 of parabolic profile to also allow effective control at low flow. The effective seal between said stem 23 and said guide 11 held in position by the cap 27 screwed onto the top of the valve body 1, is achieved by a double gland straddling a lantern sleeve 28 with intermediate venting to atmosphere 29, of which the first gland comprises in succession towards the valve exterior a metal ring 30 rigid with said guide 11, a high density base ring 34, four medium density rings 32 and a high density top ring 33, the second gland comprising a high density base ring 34, a medium density ring 35 and a high density top ring 36, said double gland being elastically pressed axially by a series of preloaded springs 37 which act on a gland presser 38 via a flange 39.

Finally, the effective seal between said guide 11 and the valve body 1 is achieved by a series of preloaded springs 40 which maintain said guide 11 elastically pressed against a surface 41 of a shoulder ring 42 retained in position by circular sectors (only two, 43 and 44, can be seen in the figure) inserted into the valve body 1. Said surface 41 has an inclination different from that of the opposing surface 45 of the guide 11, as clearly visible in the figure, in order to facilitate the obtaining of an effective seal by the autoclave effect.

The method of operating such a combination control valve is as follows.

With the valve closed as shown in the figure, the operating fluid pressure present at the valve inlet 2 is also present upstream of the main valving member 5, ie in the chambers 8, 9 and 10. In this manner the main valving member 5 is strongly pressed against its seat 4 by the fluid, this ensuring a most effective seal between the upstream and downstream sides of the valve. The pilot valving member 22 is pressed against its seat 21 by the actuator member not shown in the figure, which is connected rigidly to the valve stem 23. In this manner there is no need for a high force no provide the seal between the upstream and downstream sides of the valve as the actuator is required to supply only the force necessary to overcome the action of the spring 25 on the pilot valving member 22 and to provide the specific contact pressure between said pilot valving member 22 and its seat 21, which is very small as the contact diameter is small. During its initial stage of opening, the actuator begins to raise the pilot valving member 22, aided in this by the action of the spring 25. This raising results in depressurization of the chambers 8, 9 and 10 upstream of the main valving member 5, this evidently being a function of the dimensioning of the series of labyrinths 13, the diameter and number of balancing holes of the series of holes 16–20, and the diameter and travel stroke of the pilot valving member 22. The extent of said depressurization governs the amount of fluid flowing from the inlet 2 and through the series of labyrinths 13, this amount therefore being able to be chosen such as to compensate any leakages towards the valve exterior and hence ensure intrinsic safety of the valve. Again, the parabolic profile of the pilot valving member 22 allows effective and reliable control of the small fluid rates which flow through the seat 21 of the pilot valving member 22. If raising is continued after the shoulder 24 of the pilot valving member 22 comes into contact with the main valving member 5, the latter is also raised, the required force being still small because of said depressurization which aids raising.

The raising of the main valving member results in gradual uncovering of series of offset holes 19, 20 and 16, 17, 18 respectively, through which there flows a gradually increasing flowrate but of considerably reduced pressure following the tortuous paths which the fluid has to follow to flow from the holes of said series 19 and 20 of the cavity 15 of the main valving member 5 to the holes of the structure 14.

When all the hole series 16–20 are uncovered, the fluid begins to flow between the first seat 4 and the parabolic profile 16 of the main valving member 5 which hence controls flow with a minimum pressure drop at maximum valve opening.

I claim:

1. A combination control valve particularly suitable for thermoelectric power plant, what comprises:

a valve body provided with a fluid inlet and outlet, a first seat on said outlet for a main valving member provided with balancing holes and slidable along a guide by way of interposed seal elements balancing the valving member, and a pilot valving member rigid with a valve stem to cooperate with a second seat present within said main valving member and provided with a spring-loaded shoulder cooperating with the main valving member, a trim member located in the valve body and reducing the fluid pressure and a seal system located between said first seat and said valve body wherein said seal system comprises a double gland which straddles a lantern sleeve with an intermediate vent for detecting leakages, is installed between said valve stem and the main valving member guide, and is pressed axially by preloaded elastic elements, said guide being held and elastically pressed by a plurality of preloaded elastic elements against a surface of a shoulder ring and said shoulder ring being retained in position by circular sectors fitted into the valve body, said surface of said shoulder ring being of an inclination different from that of said guide, said seal elements balancing the main valving member and being interposed between said guide and said main valving member wherein said seal elements comprise a series of labyrinths and said pilot valving member has a parabolic profile, said trim member reducing the fluid pressure comprising at least one hollow cylindrical structure inserted coaxially into a corresponding end cavity in said main valving member, said hollow cylindrical structure having a series of transverse holes arranged offset from a corresponding series of transverse holes provided in the walls of said cavity of said main valving member, and terminating with a parabolic profile, and wherein the seal system between said first seat and said valve body comprises an elastic seal element fixed between said first seat and said valve body.

2. A combination control valve as claimed in claim 1, wherein said double gland straddling a lantern sleeve with an intermediate vent for detecting leakages is formed, in succession towards the valve exterior, from a first gland having a metal ring rigid with said main valving member guide, a high density base ring, four medium density rings and a high density top ring, followed after said lantern sleeve by a second gland having a high density base ring, a medium density ring and a high density top ring.

3. A combination control valve as claimed in claim 2, wherein said rings comprise compressed graphite.

4. A combination control valve as claimed in claim 1, wherein said elastic seal element between said first seat and said valve body comprises a bellows fixed between said first seat and said valve body respectively.

* * * * *